US010235556B2

(12) United States Patent
Hogan

(10) Patent No.: US 10,235,556 B2
(45) Date of Patent: Mar. 19, 2019

(54) FRUSTRATED TOTAL INTERNAL REFLECTION FINGERPRINT DETECTOR

(71) Applicant: Joshua Noel Hogan, Los Altos, CA (US)

(72) Inventor: Joshua Noel Hogan, Los Altos, CA (US)

(*) Notice: Subject to any disclaimer, the term of this patent is extended or adjusted under 35 U.S.C. 154(b) by 267 days.

(21) Appl. No.: 15/375,135

(22) Filed: Dec. 11, 2016

(65) Prior Publication Data
US 2017/0169282 A1 Jun. 15, 2017

Related U.S. Application Data

(60) Provisional application No. 62/266,686, filed on Dec. 13, 2015.

(51) Int. Cl.
*G06K 9/20* (2006.01)
*G06K 9/00* (2006.01)

(52) U.S. Cl.
CPC ....... *G06K 9/00046* (2013.01); *G06K 9/0004* (2013.01)

(58) Field of Classification Search
CPC ............. G06K 9/0004; G06K 9/00046; G06K 2009/0006; G06K 9/00107–9/0012
See application file for complete search history.

(56) References Cited

U.S. PATENT DOCUMENTS

| 2010/0085708 | A1* | 4/2010 | Martin | ............... H05K 7/20927 361/696 |
| 2013/0120760 | A1* | 5/2013 | Raguin | ................. G01B 11/24 356/612 |
| 2017/0032176 | A1* | 2/2017 | Higuchi | ............... A61B 5/0077 |

* cited by examiner

*Primary Examiner* — Brian Werner

(57) ABSTRACT

The device provides an optical coherence tomography system; a first bank of light emitting diodes emitting light centered about a first wavelength; a second bank of light emitting diodes, emitting light centered about a second wavelength; a prism, said prism including a first surface transmissive of the wavelength of the probe beam of the optical coherence tomography system, and a second surface which is also transmissive of the wavelength of the probe beam, and where the second is surface coated from a first edge to a midpoint so to be reflective of light at the first wavelength and transmissive of light at the second wavelength, and from the midpoint to a second edge transmissive of light at the first wavelength and reflective of light at the second wavelength; and one or more detector arrays. Alternate embodiments are taught.

3 Claims, 5 Drawing Sheets

FRUSTRATED TOTAL INTERNAL REFLECTION FINGERPRINT DETECTOR

RELATED APPLICATIONS

This application, Ser. No. 15/375,135, claims priority from U.S. provisional application 62/266,686, filed Dec. 13, 2015, the entirety of which is incorporated by reference as if fully set forth herein. This application is also related to, and incorporates by reference as if fully set forth herein applications by the same inventor as follows:

U.S. 62/249,309:Optical coherence tomography array based sub-dermal imaging device U.S. 62/236,062: Combined optical thickness and physical measurement U.S. 62/197,079: A method and system for verifying document authenticity U.S. 62/013,130: System and Method for Fingerprint Validation U.S. 62/013,130: Secure and Safe Registered Tissue Monitoring

GOVERNMENT FUNDING

None

FIELD OF USE

The invention is useful in the field of biometrics, identification and security, and more particularly in fingerprint detection and analysis.

BACKGROUND

Fingerprints are used to ensure identity, enabling secure access in many applications including, but not limited to, electronic devices such a mobile phones, tablet, computers, as well as home security systems, automobiles, secure buildings, laboratories and patient identification in medical settings.

Current fingerprint detectors are limited, with the well-known aspect being that most fingerprint detectors are spoofable by fake fingers—plastic fingers with ridges and valleys will fool even a fingerprint device that can distinguish depth. Finger print detecting performed by a variant of frustrated total internal reflection cannot distinguish between a plastic faux finger and a flesh and blood finger.

Sub-dermal fingerprints, where the skin beneath the dermal or surface layer is imaged and analyzed provide higher certainty as to identification. The sub-dermal fingerprint has the same pattern as the surface fingerprint of an individual. Sub-dermal scans can be made using optical coherence tomography (OCT), and an OCT depth scan provides a fingerprint scan that can assure the target finger is living tissue.

One optical technique to image fingerprints involves use of a prism a surface of which is illuminated in a manner that light is subject to total internal reflection (tir or TIR) when there is no skin contact with the prism. Where there is contact the total internal reflection is frustrated by the reduced refractive index mismatch, thereby enabling the capability of imaging the fingerprint with enhanced dependence on the presence of the ridges and valleys of real fingerprints.

Typically, prisms currently used in frustrated total internal reflection are thick—of a thickness that makes a TIR device undesirably thick (or deep) for use in small, light electronic devices such as, for example, smart phones and tablets.

BRIEF SUMMARY OF THE INVENTION

The invention solves at least all of the above-mentioned problems.

The invention provides fingerprint detection device comprising: an optical coherence tomography system; a first bank of light emitting diodes, said light centered about a first wavelength; a second bank of light emitting diodes, said light centered about a second wavelength; a prism, said prism including first surface, said first surface highly reflective of light centered about said first and said second wavelengths, and a second surface, said second surface distal to said optical coherent tomography system, said second surface coated from a first edge to a midpoint so to be reflective of light at said first wavelength and transmissive of light of said second wavelength, and from said midpoint to a second edge so to be transmissive of light at said first wavelength and reflective of light at said second wavelength; and a detector array.

The optical coherence tomography system probe beam is centered about a third wavelength range, which said third wavelength range is different from said first and said second wavelength ranges, and wherein said first and said second surfaces are transmissive at said third wavelength range.

In an alternate embodiment, the fingerprint detection device is comprised of a first bank of light emitting diodes, said light centered about a first wavelength; a second bank of light emitting diodes, said light centered about a second wavelength; a prism, said prism including a first surface, said first surface highly reflective of light centered about said first and said second wavelengths, and a second surface, said second surface coated from a first edge to a midpoint so to be reflective of light at said first wavelength and transmissive of light of said second wavelength, and from said midpoint to a second edge so to be transmissive of light at said first wavelength and reflective of light at said second wavelength; and a detector array.

BRIEF DESCRIPTION OF THE DRAWINGS

The following drawings are provides as an aid to understanding the invention.

DETAILED DESCRIPTION OF A PREFERRED EMBODIMENT

To appreciate the invention, it is useful to discuss how a fingerprint is obtained using the principle of frustrated total internal reflection. The abbreviation, TIR as used herein is intended to mean "total internal reflection."

Figure 1:
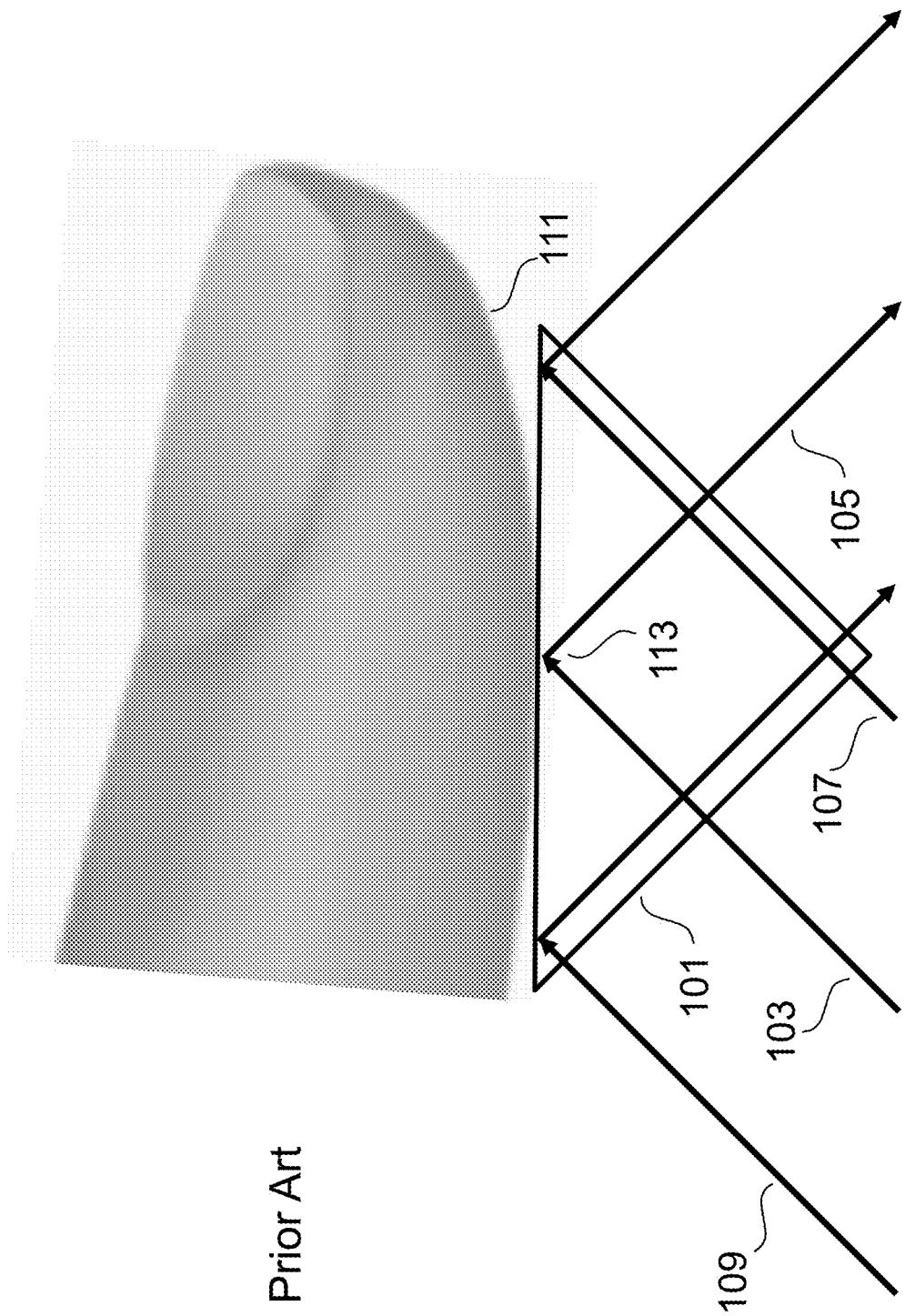
FIG. 1 (prior art) depicting a finger print detector using frustrated total internal reflection.

Referring now to FIG. 1, FIG. 1 depicts a finger 111 from which a fingerprint is to be obtained. The finger is in contact with one of the three surfaces of a prism 101. Incident light is depicted by three rays 109, 103 and 107, each ray striking a different point on the surface beneath the finger 111.

The full top surface (labeled surface A in FIG. 2) of the prism 101 is illuminated by incident beams spanning from line 107 to 109. Typically, incident light is supplied by one or more LEDs centered at the same wavelength.

With respect to incident light 103, the ray is shown striking, at point 113, the surface of prism 101 which surface is in contact with the finger 111. If, at point 113, there is no contact between the prism and finger tissue, then the incident light is totally internally reflected and goes to a detection system along line 105.

Alternatively, if, at point 103, there is contact with tissue, then total internal reflection is frustrated, and a reduced or diminished amount of light is reflected along line 105 to the detector.

Fingerprint ridges and valleys differ in the degree to which they frustrate TIR owing to varying degrees of contact with the surface; the reflected light is used to generate an image of the fingerprint. A valley with no contact does not frustrate TIR.

Figure 2:
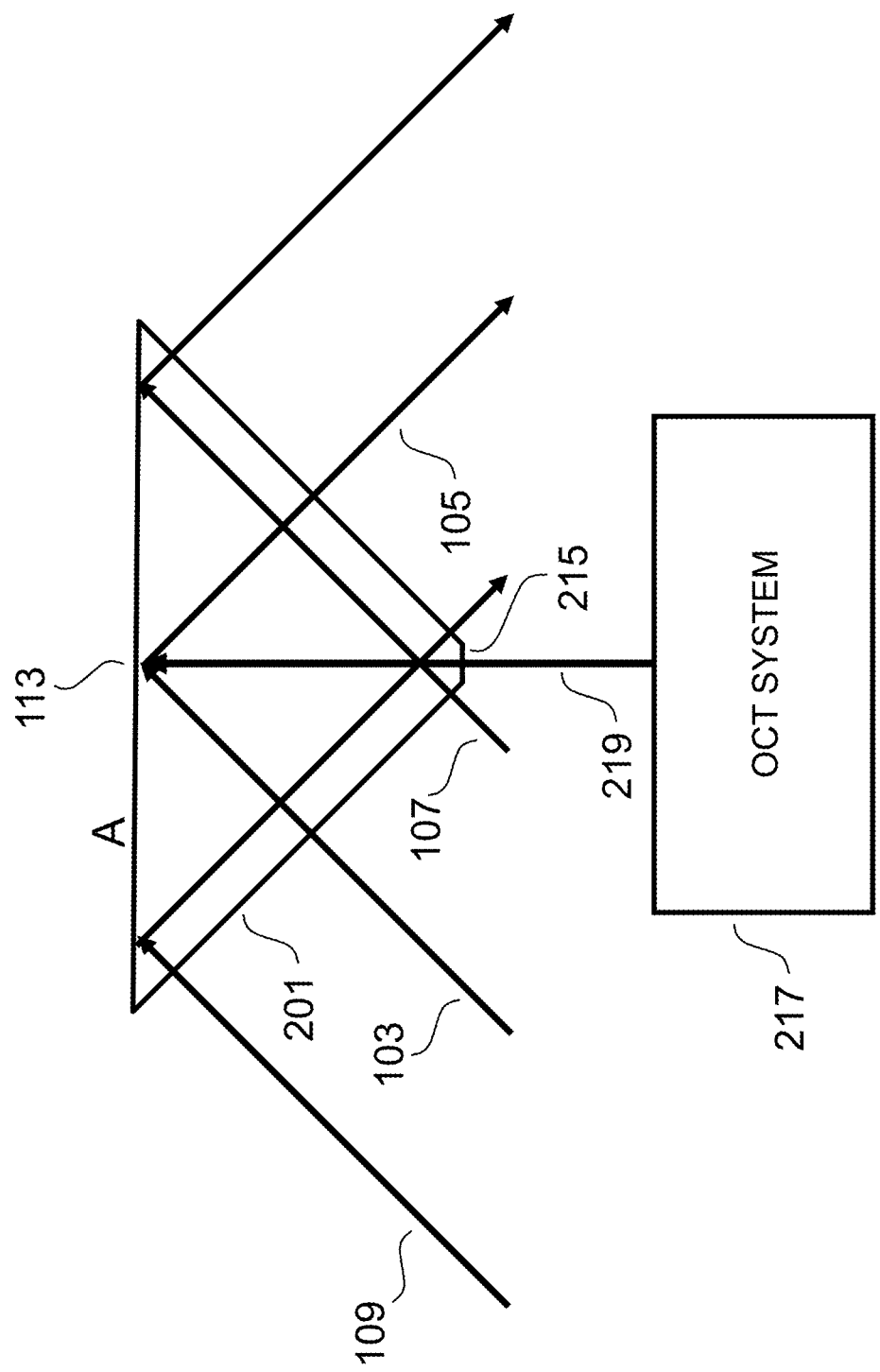
FIG. 2 depicts a combined frustrated total internal reflection detector and an optical coherence tomography imaging system.

Referring now to FIG. 2. FIG. 2 is similar to FIG. 1, except that whereas in FIG. 1, the prism had three sides, FIG. 2 shows a fourth surface 215 of the prism 201 that is flat and parallel to side A, which Side A is the surface of the prism supporting the finger under analysis. The prism has a depth D (or length) that is not depicted, but would be the distance into the page.

FIG. 2 includes an optical coherence tomography (hereafter OCT) system 217 and 219 is the optical signal from the OCT system 217; this enables the use of an OCT to scan, initially, the point 113. The device can now scan along the prism depth D; therefore the OCT scans a line along depth D of which 113 is a point on the line. The OCT scans at a depth in the target, thus producing what is commonly referred to as a B-Scan (see 401 of FIG. 4). Depending on the length of the flat surface 215 more than one adjacent OCT B-scans can be acquired.

Figure 4:
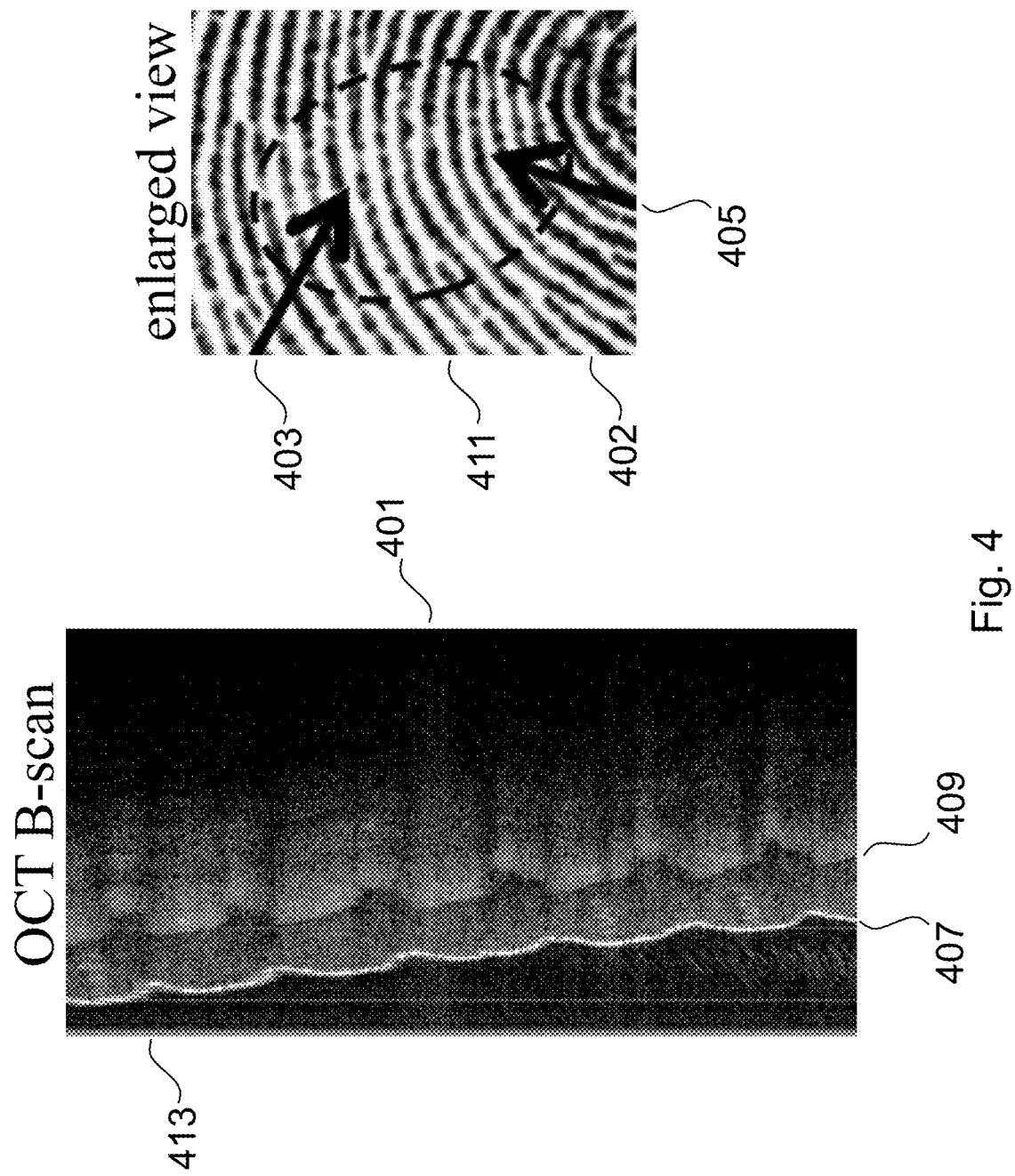
FIG. 4 shows an enlarged view of a conventional fingerprint and an OCT B-scan, illustrating that the features of the conventional fingerprint are identifiable in the OCT B-scan.

Referring to FIG. 4, a typical OCT B-scan, 401, is shown, where 407 is the front surface of the finger (where the conventional fingerprint resides), and 409 is the sub dermal fingerprint beneath the conventional fingerprint.

The conventional fingerprint image 403 includes two points 403 and 405 indicating a line where the B scan 401 is taken; 411 indicates a ridge; 402 indicates a valley.

In the B-scan 410 note that the features of the surface layer 407 are repeated in the sub-dermal layer 409. See, for example the valley 413 of the surface 407, and see the corresponding valley (unnumbered) in the sub-dermal finger print 409. The degree to which features in the surface and sub-dermal fingerprints correspond to each other provides additional confidence that the detected fingerprint is real. Conversely, lack of correlation would indicate a problematic or fake fingerprint.

Referring again to FIG. 2, it can be appreciate that the width of the flat surface 215 restricts the number of adjacent B scans that can be obtained. More B-scans, that is to say, a larger number of B-scans enable greater correlation between surface and sub-dermal which ensures greater certainty of a fingerprint being legitimate or fake and consequently greater security.

Figure 3:
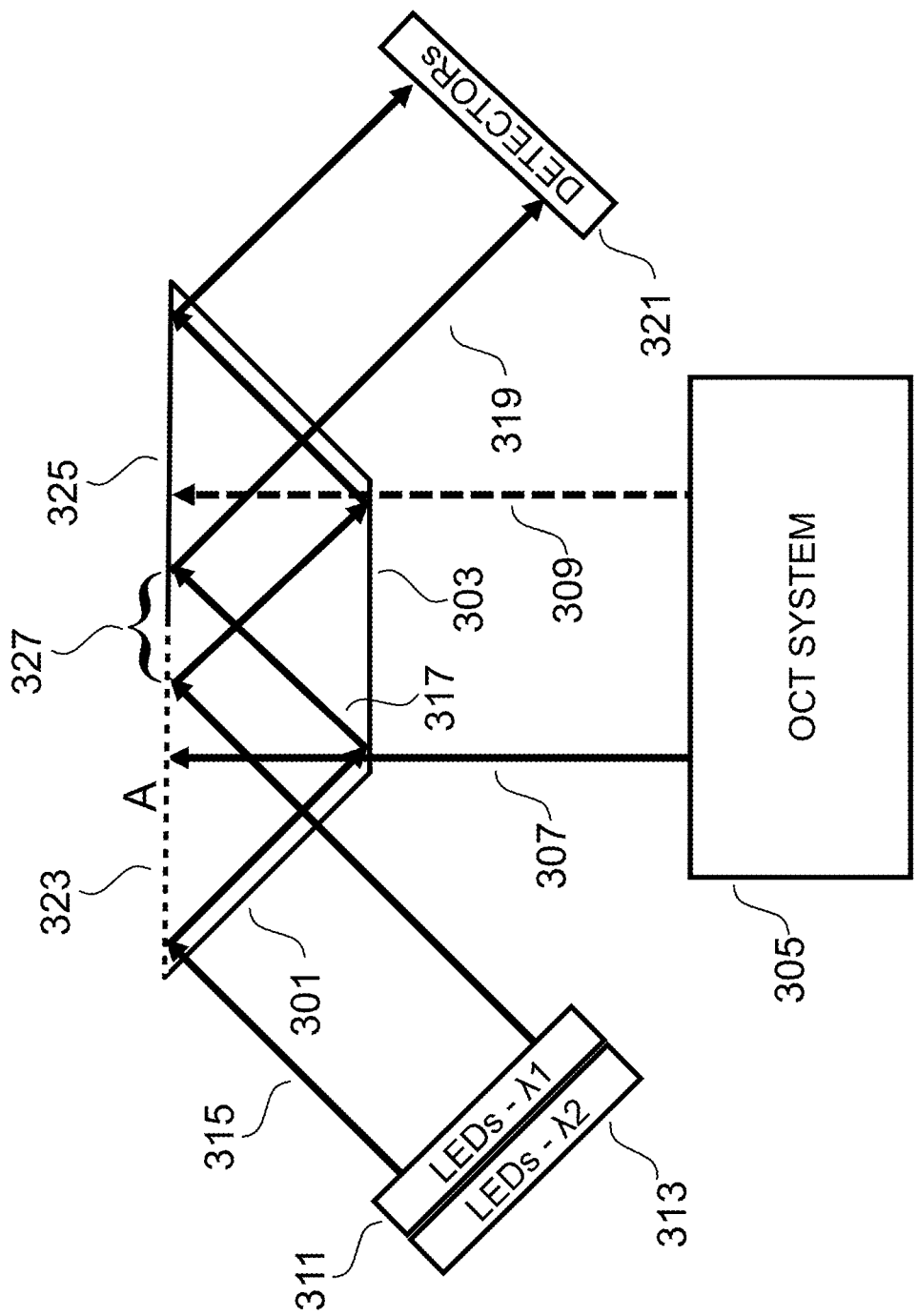
FIG. 3 depicts an embodiment of the invention.

Referring now to FIG. 3, a preferred embodiment of the invention is depicted.

In FIG. 3, the prism 301 has an extended flat surface 303. The extended flat surface 303 allows the OCT system 305 to scan an extended range, providing a large number of B scans e.g. scans from 307 to the dashed line 309.

The extended range, 307 to 309, provides B-scan coverage of approximately ⅓ (one third) of the area obtained by a conventional surface fingerprint device. In order to obtain coverage that is congruent with the surface area covered by a conventional fingerprint, two banks of LEDs are used (a first LED bank 311 and a second LED bank 313). The first LED bank 311 is centered on a first wavelength L1, and the second LED bank 313 is centered on a second, different wavelength L2. Note that in some alternate embodiments, a bank consists of a single LED or other type of light source.

Surface A is coated to the mid point such that it is reflective of light centered on L1, and can transmit light centered on L2. After the midpoint, surface A is coated such that is transmissive of light centered on L1 and reflective of light centered on L2. The extended flat surface 303 is highly reflective (i.e. greater than 95 percent) of light centered on both L1 and L2.

Light emitted by the first bank 311 and centered on L1 will proceed along path 315, where it is reflected at surface A, and again reflected at extended flat surface 303, to form 317 which is applied to the surface of side A where it can either be TIR or frustrated TIR by contact with flesh, i.e. finger ridge. The resultant signal is reflected along 319 to a detector array 321.

Light emitted by the second bank 313 centered on L2 proceeds along 315, where it is either TIR or frustrated TIR; the resultant light is reflected by extended flat surface 303, and also by the second half of side A, where it also proceeds along 319 to the detector array 321.

By alternating between the first and second LED bank 311 and 313, the entirety of side A is probed—the first bank 311 interrogates the right hand of surface A—325—and the second bank 313 interrogates the left side of surface A—323. Because the LEDs are time multiplexed, a single array is used for detecting light centered on L1 and L2.

The invention has many advantages, including providing a plurality of OCT B scans and greater certainty in fingerprint analysis and correspondingly greater security.

The invention also provides a compact device; the prism needed for TIR/frustrated TIR in reduced in height. Moreover, the detector array size is halved.

An embodiment according to the invention fits into package sizes already fairly established in the marketplace of devices such as slim mobile phones such as, for example, the iPhone and similar smart phones, tablets and other electronic devices.

Figure 5:
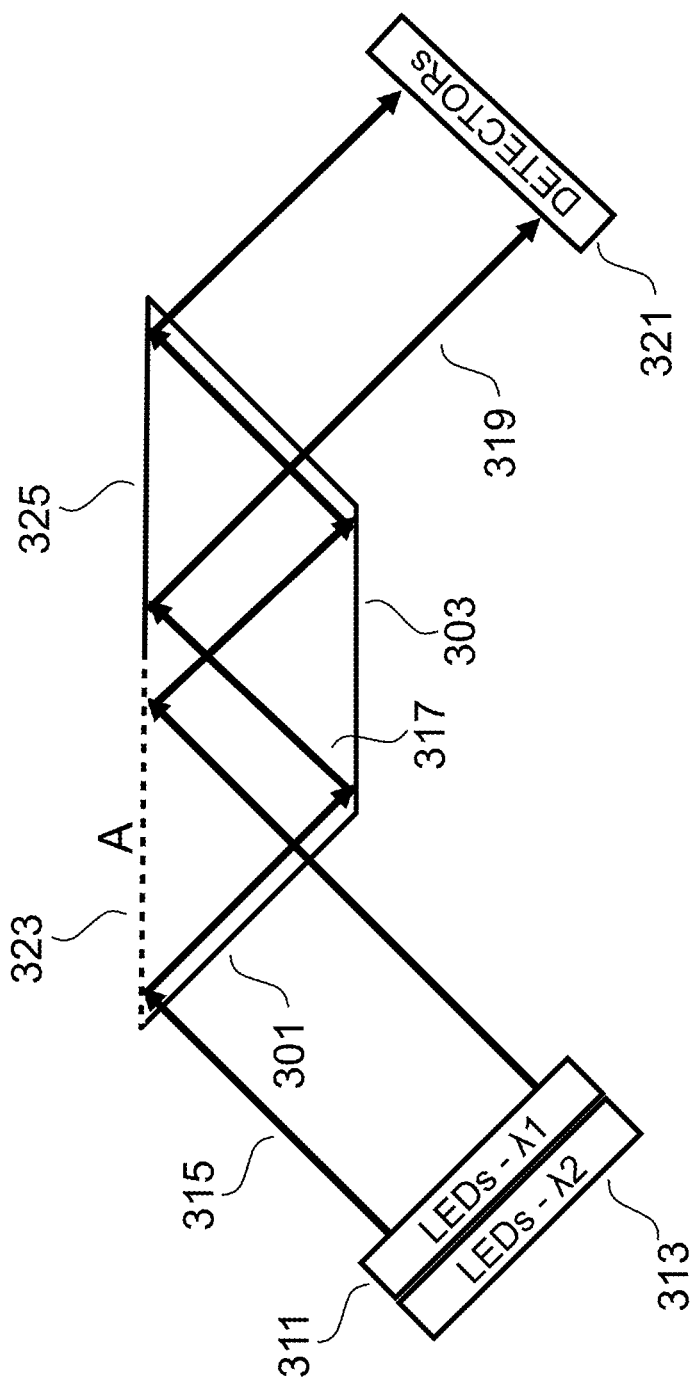
FIG. 5 depicts an alternate embodiment of the invention that does not involve an OCT system.

Referring now to FIG. 5, FIG. 5 depicts an alternate embodiment which produces a conventional fingerprint. The elements are numbered as they appear in FIG. 3. As in FIG. 3, a first and second bank of LEDs are used (first LED bank 311 and second LED bank 313). The first LED bank 311 is centered on a first wavelength L1, and the second LED bank 313 is centered on a second, different wavelength L2.

Surface A is coated to the mid point such that it is reflective of L1, and can transmit L2. After the midpoint, surface A is coated such that is transmissive of L1 and reflective of L2. The extended flat surface 303 is highly reflective (i.e. greater than 95 percent) at both L1 and L2.

Note, with respect to FIG. 3, the region of the prism depicted as 327 is not shown as being illuminated by light of either the first or second wavelength. However the light is not required to be highly collimated and therefore will readily also illuminate the region depicted as 327.

Light emitted by the first LED bank 311 and centered on L1 will proceed along path 315, where it is reflected at surface A, and again reflected at extended flat surface 303, to form 317 which is applied to the surface of side A where it can either be TIR or frustrated TIR by contact with flesh, i.e. finger ridge. The resultant signal is reflected along 319 to a detector array 321.

Light emitted by the second LED bank 313 centered on L2 proceeds along 315, where it is either TIR or frustrated TIR; the resultant light is reflected by extended flat surface 303, and also by the second half of side A, where it also proceeds along 319 to the detector array 321.

By alternating between the first and second LED banks 311 and 313, the entirety of side A is probed—the first bank 311 interrogates the right hand of surface A—325—and the second bank 313 interrogates the left side of surface A—323. Because the LEDs are time multiplexed, a single detector array is used for detecting light centered on L1 and L2.

Although the embodiments provided herein use two LED wavelengths, it can be appreciated that in further embodiments, a plurality of wavelengths are used, with a plurality of reflective, partially reflective, transmissive and partially transmissive elements, thereby further lowering the profile while maintaining range of fingerprint imaged. In some embodiments, the surface area of said first surface is maximized to enable greatest scan area by the optical coherence tomography system. For example, in the case where a plurality of LED wavelengths are used.

In other embodiments, the different surfaces reflectivities are achieved using conventional dielectric stacks. Further embodiments use a protective layer to separate the reflection process and the TIR frustration effect.

I claim:

1. A fingerprint detection device comprising:
a first bank of light emitting diodes, said light centered about a first wavelength;
a second bank of light emitting diodes, said light centered about a second wavelength;
a prism, said prism including a first surface, said first surface highly reflective of light centered about said first and said second wavelengths, and a second surface, said second surface coated from a first edge to a midpoint so to be reflective of light at said first wavelength and transmissive of light of said second wavelength, and from said midpoint to a second edge so to be transmissive of light at said first wavelength and reflective of light at said second wavelength; and
a detector array.

2. The device as in claim 1, further including
an optical coherence tomography system,
wherein said optical coherence tomography system probe beam is centered about a third wavelength range, which said third wavelength range is different from said first and said second wavelength ranges, and wherein said first and said second surfaces are transmissive at said third wavelength range.

3. The device as in claim 2, wherein the surface area of said first surface is maximized to enable greatest scan area by said optical coherence tomography system.

* * * * *